UNITED STATES PATENT OFFICE.

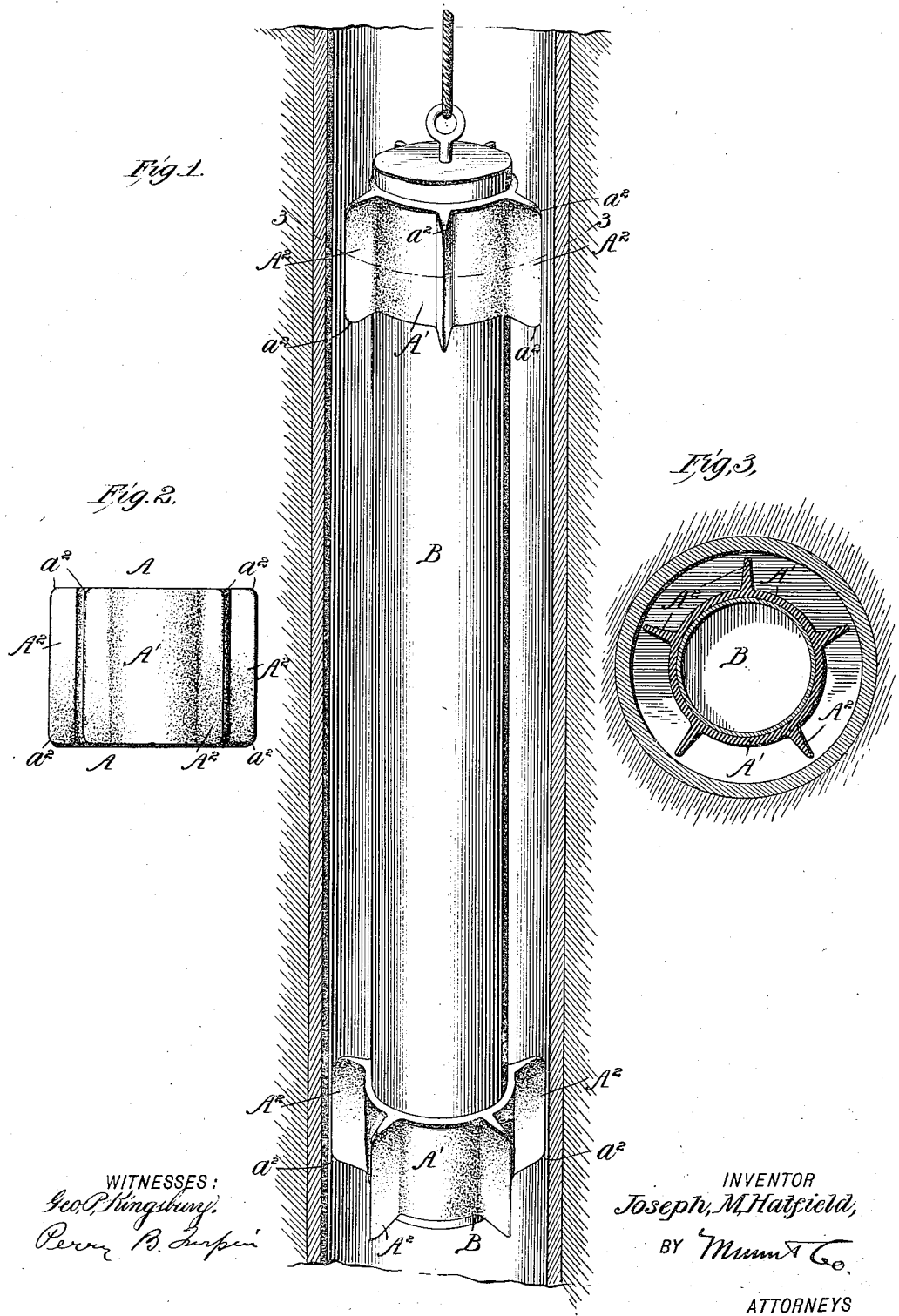

JOSEPH M. HATFIELD, OF CORNING, OHIO.

TORPEDO-SHELL PROTECTOR.

SPECIFICATION forming part of Letters Patent No. 710,323, dated September 30, 1902.

Application filed February 6, 1902. Serial No. 92,837. (No model.)

*To all whom it may concern:*

Be it known that I, JOSEPH M. HATFIELD, a citizen of the United States, residing at Corning, in the county of Perry and State of Ohio, have made certain new and useful Improvements in Torpedo-Shell Protectors, of which the following is a specification.

My invention is an improvement in devices for use in connection with oil-well torpedoes, being designed to provide a protector applied to the said shell and to operate as a guide therefor in passing the shell through the casing of the well in lowering the torpedo into the well, whereby to avoid the friction and jars incident to such operation; and the invention consists in certain novel constructions and combinations of parts, as will be hereinafter described and claimed.

In the drawings, Figure 1 is a side view of a torpedo-shell provided with my improvements and adapted to be inserted in a well-casing, such casing being shown in section. Fig. 2 is a detail side elevation of one of the protecting devices, and Fig. 3 is a cross-sectional view on about line 3 3 of Fig. 1.

The guard or protector A is made of soft rubber and consists of a short tubular or cylindrical body A', which is adapted to be expanded over the shell and fit the latter tightly, so it will be retained in place upon the shell in lowering the torpedo through the casing to the desired point. Upon its outer side the cylinder A' is provided with a series of outwardly-projecting flanges or ribs $A^2$, which extend from end to end of the cylinder and are slightly rounded at $a^2$, as shown, which avoids any square edges at the ends of the ribs and facilitates the passage of the device through the casing. I provide two of these guides on the torpedo-shell B, one at the top and one at the bottom, to steady the shell and guide it in its movements in the casing and keep the shell from coming in contact or rubbing against the walls of the casing in lowering the torpedo to position for firing. It will be understood that in practice the shells are ordinarily made of tin and vary in size to suit the number of quarts of nitroglycerin used in a shot, and it will also be understood that the guides or protectors may also be made in different sizes to suit the ordinary sizes of shell.

In use the shells are lowered through the casing by a cord and in the downward movement rub against the casing, producing a friction and sometimes causing the glycerin to explode, destroying the casing and frequently resulting in considerable loss of life. The improved guides avoid this friction, loss of life, and injury to the walls by cushioning the shell in the manner described, such cushioning resulting from the cylindrical soft-rubber guards, and the cushioning effect being greatly increased by means of the ribs or lugs $A^2$, before described.

The torpedo-shells are generally from four to five inches in diameter and from four to five feet in length, and the guides may be made in different sizes or may be made sufficiently elastic to be sprung into place on the different sizes of shell.

Having thus described my invention, what I claim as new, and desire to secure by Letters Patent, is—

1. An oil-well-torpedo shell provided at its opposite ends with a guard or guide composed of soft rubber and consisting of the cylindrical body expanded over the shell and the ribs or lugs extending longitudinally on the outer side of the cylindrical body from end to end thereof and slightly rounded at their ends, substantially as and for the purposes set forth.

2. A guide or guard for an oil-well-torpedo shell consisting of the cylindrical body, and the ribs or lugs projecting from the outer side thereof, substantially as set forth.

3. A guide or guard for torpedo-shells, consisting of a soft-rubber cylinder to be expanded over the shell and longitudinal ribs or lugs on the outer side of the said cylinder, substantially as set forth.

4. An oil-well-torpedo shell provided with the spaced-apart cushioning guides or guards composed of the cylindrical bodies expanded over the shell and the ribs or flanges on the outer side of said cylindrical bodies, substantially as and for the purposes set forth.

JOSEPH M. HATFIELD.

Witnesses:
T. M. POTTER,
C. E. FISHER.